June 23, 1942.  E. J. ROTH  2,287,396
FAT LEVELING SYSTEM
Filed May 9, 1941  4 Sheets-Sheet 2
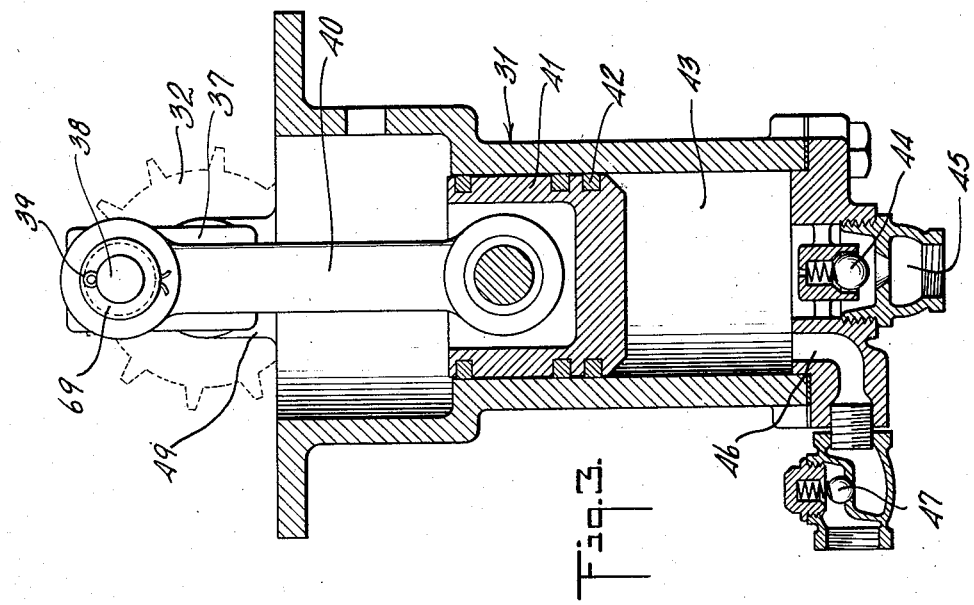
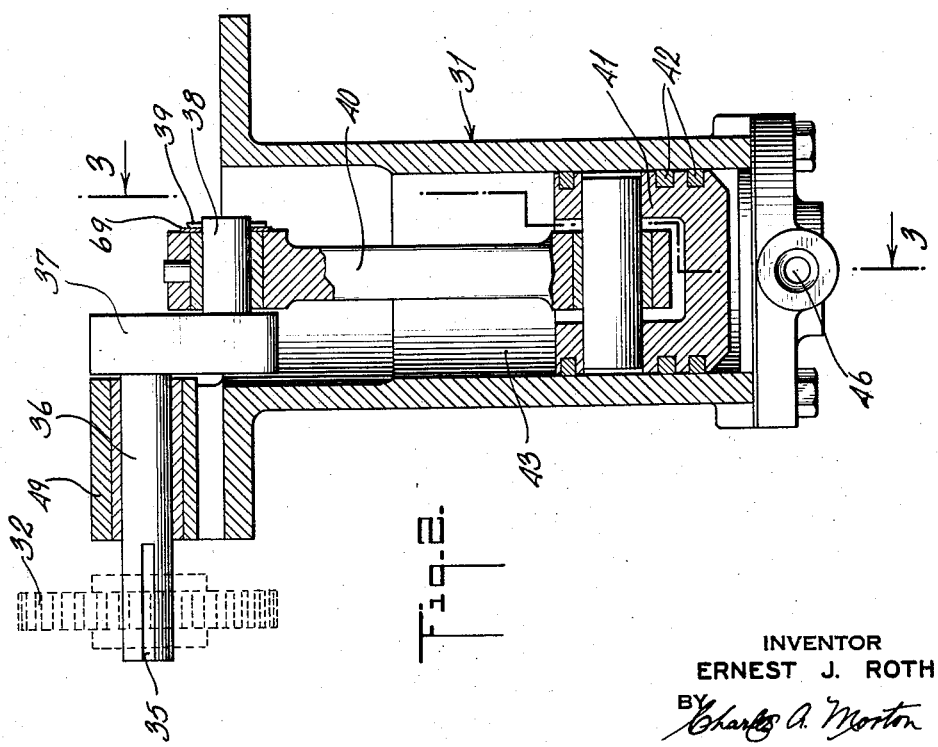
INVENTOR
ERNEST J. ROTH
BY
Charles A. Morton
ATTORNEY

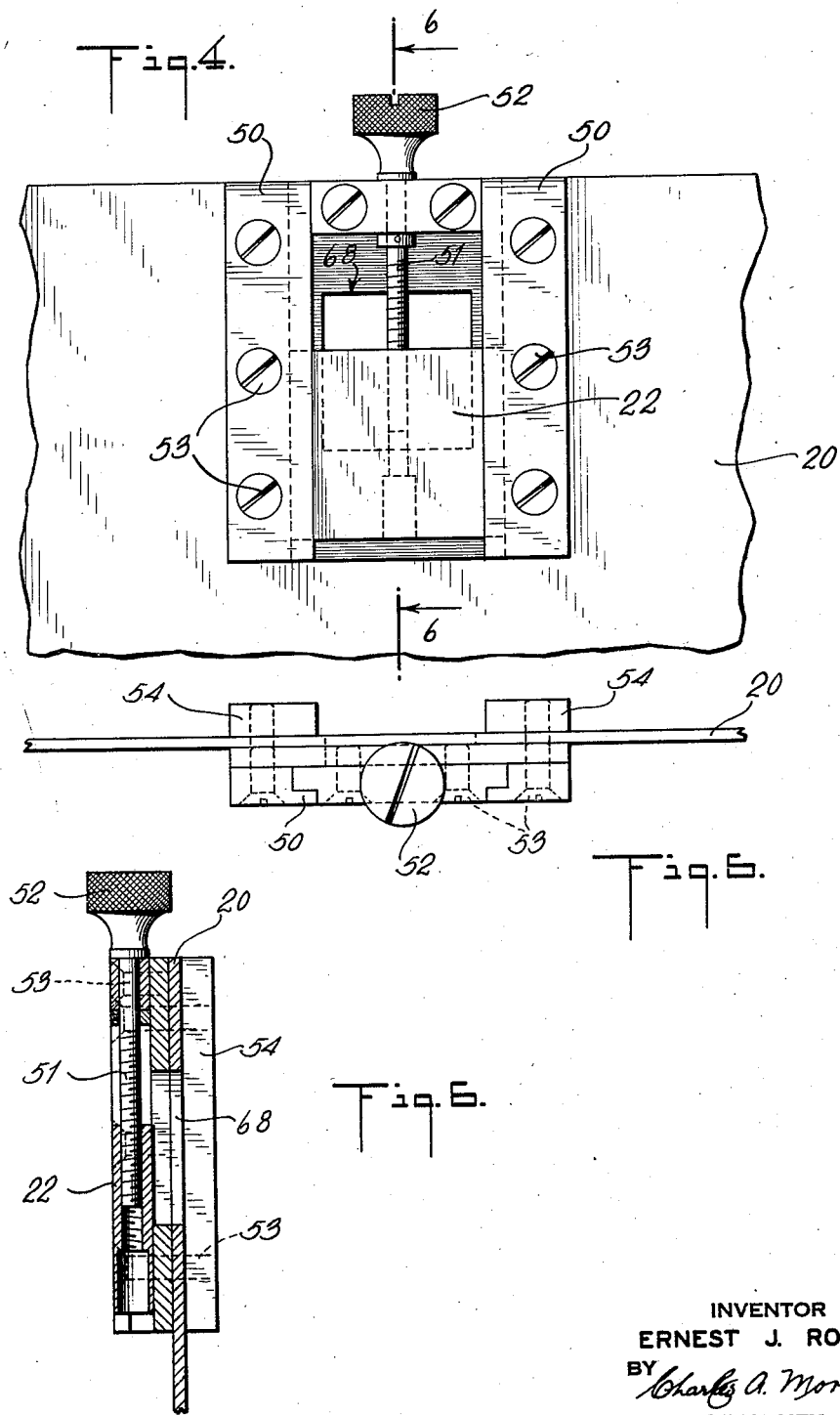

June 23, 1942.　　　E. J. ROTH　　　2,287,396
FAT LEVELING SYSTEM
Filed May 9, 1941　　　4 Sheets-Sheet 4
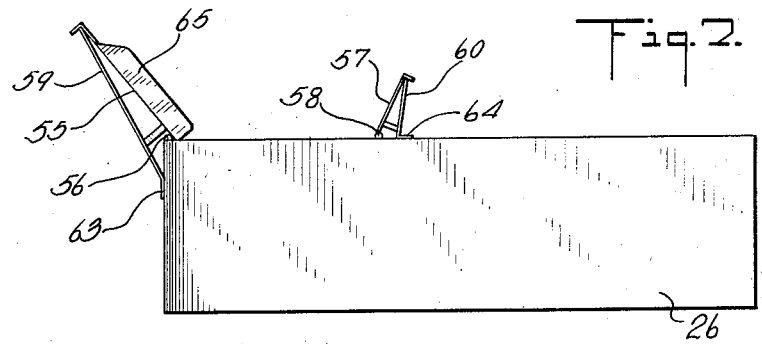
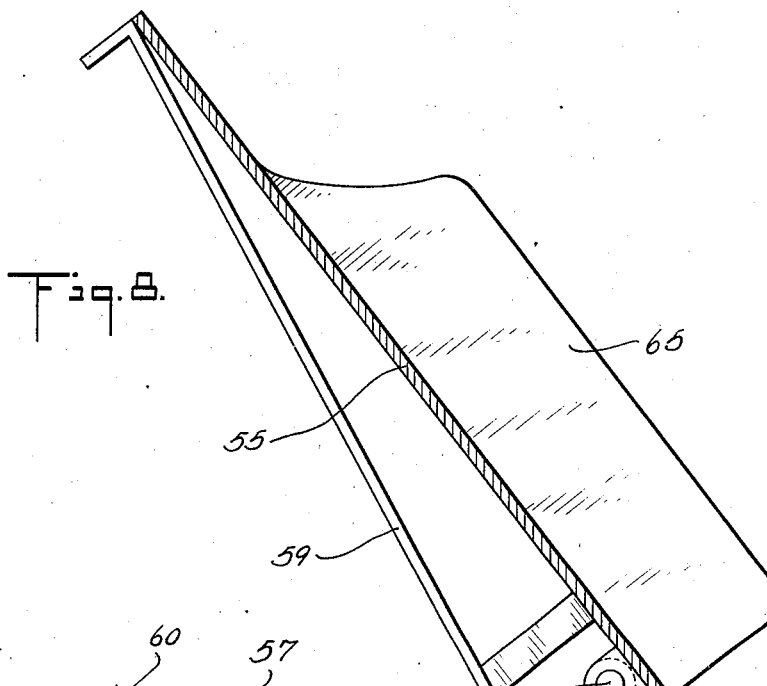
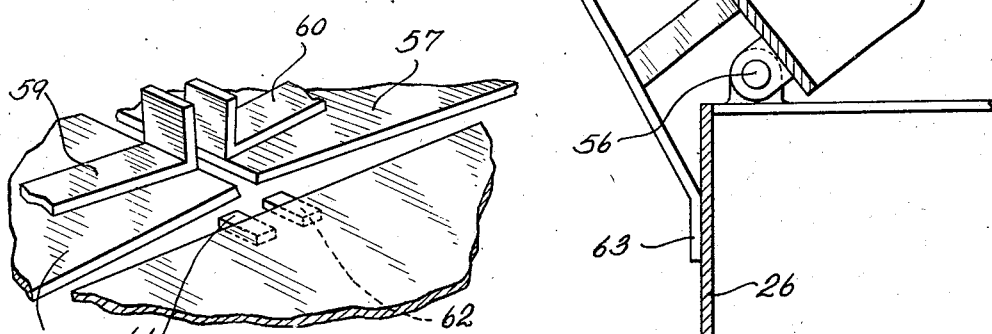
INVENTOR
ERNEST J. ROTH
BY
Charles A. Morton
ATTORNEY Patented June 23, 1942

2,287,396

UNITED STATES PATENT OFFICE 2,287,396

FAT LEVELING SYSTEM

Ernest J. Roth, Norwood, N. J., assignor to Joe Lowe Corporation, New York, N. Y., a corporation of Delaware Application May 9, 1941, Serial No. 392,678

2 Claims. (Cl. 53—7)

This invention relates to a fat leveling system for a doughnut frying machine, and more particularly to a fat leveling system for an automatic doughnut machine of the moving conveyor type.

Heretofore, it has been the practice to replenish the frying fat consumed during cooking, from a reserve fat supply tank positioned above the frying kettle, the fat thus supplied being delivered over a gravity system. Such a system necessarily includes an automatic control valve for regulating the gravity feeding of the frying fat. The use of an automatic control valve increases the risk of mechanical failure, and the position of the reserve supply tank above the frying kettle is not only an obstruction but is also a fire hazard.

The object of this invention is a fat leveling system wherein the risk of mechanical failure and the fire hazard is reduced to a minimum.

In accordance with this invention, the reserve supply tank is located below the frying kettle, the frying fat being supplied to the frying kettle by means of a circulating pump having a capacity in excess of the normal rate of fat consumption due to cooking, the fat level in the frying kettle being manually regulated by an adjustable overflow gate, and any excess fat above the predetermined level being drained off through the adjustable gate and returned to the reserve supply tank over a gravity return system.

In the drawings comprising four sheets of nine figures numbered Figs. 1 to 9 both inclusive one suggested embodiment of the invention is illustrated.

Fig. 2 is a detailed cross sectional view of the fat circulating pump;

Fig. 3 is a vertical cross sectional view of the fat circulating pump taken along the line 3—3 of Fig. 2 looking in the direction of the arrows;

Fig. 4 is an enlarged front view of the adjustable gate;

Fig. 5 is a top plan view of the adjustable gate;

Fig. 6 is a vertical cross sectional view taken along the line 6—6 of Fig. 4 looking in the direction of the arrows;

Fig. 7 is a side view of the fat reserve tank;

Fig. 8 is an enlarged vertical cross sectional view of the reserve tank cover in open position; and Fig. 9 is a perspective view showing certain details of construction of the fat supply tank cover and cover top.

Like reference characters designate corresponding parts throughout the several figures of the drawings.

Figure 1:
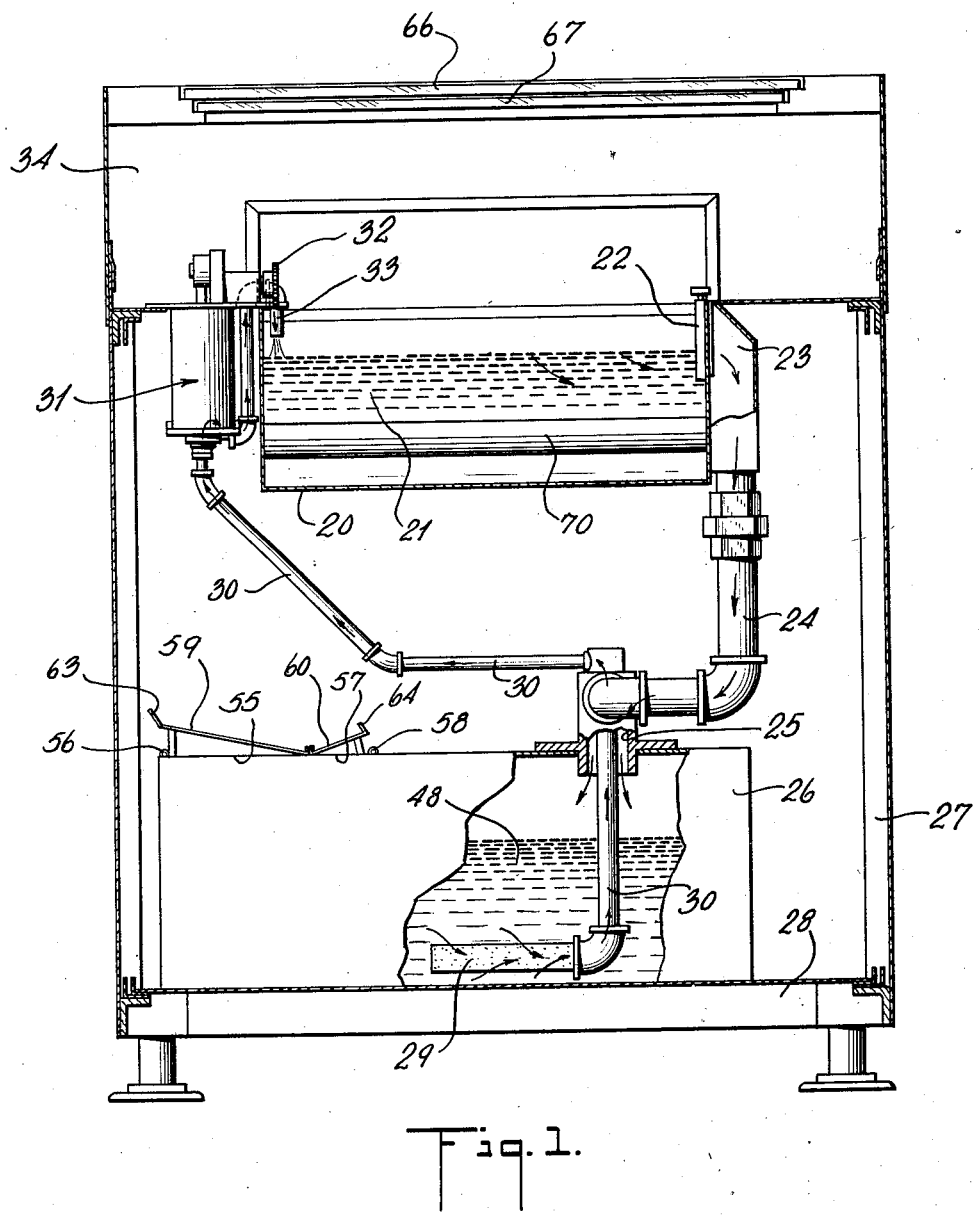
Fig. 1 is a diagrammatic view of the fat leveling system, combined with a doughnut frying machine which is illustrated in cross section.

The frying kettle 20, containing the frying fat 21, is supported upon a suitable frame 27. A platform 28 is attached to the base of the frame 27 in any suitable manner as by nuts and bolts, riveting, welding or the like. A reserve tank 26 containing a reserve supply of frying fat 48 is supported by the platform 28 below the frying kettle 20. The burner tube 70 is heated by a gas burner (not shown) connected with a suitable source of gas supply, to melt the frying fat 21.

As best illustrated in Fig. 4, the wall of the frying kettle 20 is cut out near the top to provide an opening 68, and an adjustable gate 22 is mounted in said opening and attached to the side wall of frying kettle 20 by means of suitable machine screws 53—53, which pass through the frame 50 of the gate, and through the side wall of frying kettle 20 into the reinforcing plates 54—54 (Figs. 5 and 6) of the gate frame 50. The gate 22 is mounted for up and down sliding movement in gate frame 50, in any suitable manner. As shown in Fig. 5 the edges of the adjustable gate 22 may be rabbeted to engage the oppositely rabbeted guide channels in the gate frame 50. The adjustable gate 22 is drilled and tapped to receive a worm screw 51 which is provided with a knurled head 52 for facilitating the rotation of the worm screw 51 to raise and lower the adjustable gate in its guide frame 50, thus varying the height of the adjustable gate relative to the opening in the side wall of frying kettle 20, to regulate the fat level in the frying kettle. An overflow chamber 23 is attached to the outer wall of frying kettle 20, and when the level of the frying fat 21 rises above the top of the adjustable gate 22, the excess fat flows through the opening 68 into the overflow chamber 23, thence through the overflow pipe 24 and nipple 25, into the reserve tank 26.

The frying fat 21 in the frying kettle 20 is replenished by means of a fat circulating pump 31, which is connected with reserve tank 26 by means of a supply pipe 30 passing downwards through the center of nipple 25 into reserve tank 26. A strainer 29 is attached to the lower end of supply pipe 30, the mesh of the strainer being small enough to prevent foreign particles from reentering the frying kettle 20 by way of fat pump 31. The pump 31 may be driven in any preferred manner. As shown in the drawings, pump 31 may be connected to a drive sprocket 32 driven by a sprocket chain directly or indirectly coupled to the electric motor or other prime mover (not shown) by which the conveyor mechanism of the frying kettle is driven.

The fat pump 31 may be constructed as shown in Figs. 2 and 3. A reciprocating piston 41 is mounted in a cylinder 43, the piston being driven by a piston rod 40. A series of piston rings 42—42 may be set in the piston head to insure a proper seal. The drive sprocket 32 is keyed at 35 to a shaft 36, which is journalled in a suitable bracket 49 mounted upon the drying kettle 20. Shaft 36 drives crank 37 which in turn drives crank pin 38 and piston rod 40. Cotter pin 39 serves to retain the head of rod 40 upon crank pin 38. The inlet port 45 of the fat pump 31 is connected to supply pipe 30. The inlet port may be provided with a ball seal 44. The delivery port 46 of pump 31 may also be provided with a suitable ball seal 47. A suitable delivery pipe 33 which is connected with the delivery port outlet empties into the frying kettle 20 adjacent the fat level of the tank. A suitable removable hood 34 may be detachably secured above the frying kettle 20. The hood may be provided with sliding glass covers 66 and 67 to permit access to the frying kettle without removing the hood 34.

The reserve tank 26 is preferably provided with one or more cover members 55, 57, pivoted at their outer ends on hinges 56, 58, so as to swing outwardly from the center. The covers 55, 57 may be reinforced with one or more braces 59 and 60, each brace being bent upwardly at its outer end to form a back stop 63, 64, which engages against the wall of the supply tank 26 to limit the extent of the swinging movement of its associated cover 55 or 57. Suitable cover stops 61 and 62 (Fig. 9) may be attached to the inner wall of reserve tank 26 so as to support the covers 55 and 57 in their closed position. As best illustrated in Fig. 8 the cover member 55 when open preferably occupies an inclined position. The side edges of cover member 55 may be bent over at right angles to form a trough having a pair of oppositely disposed side walls 65. The trough thus formed constitutes a loading chute for delivering solid fat into reserve tank 26. Back stop 63 of the brace 59 is so adjusted as to retain cover 55 sufficiently inclined in open position (Fig. 8) to cause any solid fat placed in the trough or delivery chute to slide into the reserve tank. After the reserve tank has been reloaded, the cover members 55 and 57 may be closed (Fig. 9).

*Principle of operation*

The frying fat 21 having been heated to the melting point, the adjustable gate 22 is set at that level which insures proper operation of the conveyor and of the turner, and the motor for driving the doughnut machine is started, thus actuating the sprocket chain which drives the sprocket 32 to operate the fat circulating pump 31. The circulating pump draws molten fat from the reserve tank 26, through the strainer 29, supply pipe 30, cylinder 43, and delivery pipe 33, into frying kettle 20, thus raising the fat level in the frying kettle. When the level of the fat in the frying kettle rises above the top of the adjustable gate, the frying fat 21 overflows through the opening 68 into the overflow chamber 23, and returns by gravity through the overflow pipe 24, into reserve tank 26. The molten fat flowing through the nipple 25 raises the temperature of supply pipe 30 and of the fat in the region of the strainer 29 forming the entrance to supply pipe 30, thus tending to keep the fat in the supply pipe 30 and the fat which surrounds the entrance thereto in molten condition. The delivery capacity of the fat circulating pump 31 exceeds the rate of fat consumption of the doughnut machine, so that when the machine is in operation there is always an excess supply of frying fat delivered to the frying kettle 20, thus insuring circulation of the frying fat at all times. When the frying fat is first heated preparatory to using the doughnut machine, the adjustable gate 22 may be lowered to permit a quantity of hot fat to overflow through the overflow pipe 24 and nipple 25 into reserve tank 26 in the region of the entrance to the supply pipe 30, thus melting the fat in reserve tank 26 progressively outwards from the entrance to supply pipe 30.

To replenish reserve tank 26, the covers 55 and 57 swing outwards to the position indicated generally in Fig. 7 of the drawings. With the covers in this position, more frying fat may be inserted in the reserve tank 26 through the hopper shaped opening formed by the covers 55, 57 (Fig. 7). After the reserve tank 26 has been refilled, the covers 55 and 57 may be closed. By this arrangement, the frying fat in the reserve tank 26 can be replenished from time to time without interfering with the continuous operation of the doughnut machine.

What is claimed is:

1. A fat leveling system for a doughnut machine comprising a kettle for containing frying fat, a tank for containing a reserve supply of fat for replenishing the fat in the frying kettle, said tank being positioned beneath the kettle, a circulating pump mounted upon the wall of the kettle, a supply pipe connecting the tank with the intake side of the pump, a delivery pipe connected to the delivery side of the pump and emptying into the frying kettle, an overflow chamber adjoining and opening into said frying kettle, a gate mounted in the opening between said overflow chamber and said frying kettle, said gate being slidably adjustable to different heights to raise and lower the fat level of the kettle to allow excess fat to flow from the kettle into the overflow chamber, and a gravity return pipe connecting with said overflow chamber and extending downwardly therefrom into said reserve tank in close proximity to said supply pipe to utilize the hot fat drained out of the kettle to melt the fat in the reserve tank commencing with that portion of the fat which immediately surrounds the entrance to the supply pipe.

2. A fat leveling system for a doughnut machine comprising a kettle for containing frying fat, a tank for containing a reserve supply of fat for replenishing the fat in the frying kettle, said tank being positioned beneath the kettle, a circulating pump mounted upon the wall of the kettle, a supply pipe connecting the tank with the intake side of the pump, a delivery pipe connected to the delivery side of the pump and emptying into the frying kettle, an overflow chamber adjoining said frying kettle, a gate mounted between said overflow chamber and said frying kettle, said gate being slidably adjustable to different heights to raise or lower the fat level of the kettle to allow excess fat to overflow from the kettle into the overflow chamber, a nipple connected with said reserve tank, said nipple forming a jacket enclosing a portion of the supply pipe, and a gravity return pipe connecting with said overflow chamber and extending downwardly therefrom into said nipple to direct the excess hot fat drained out of the frying kettle back into the reserve tank in the region of the entrance to the supply pipe so as to raise the temperature of the jacketed portion of the supply pipe and first melt the fat which surrounds the entrance thereto.

ERNEST J. ROTH.